Fig. 13

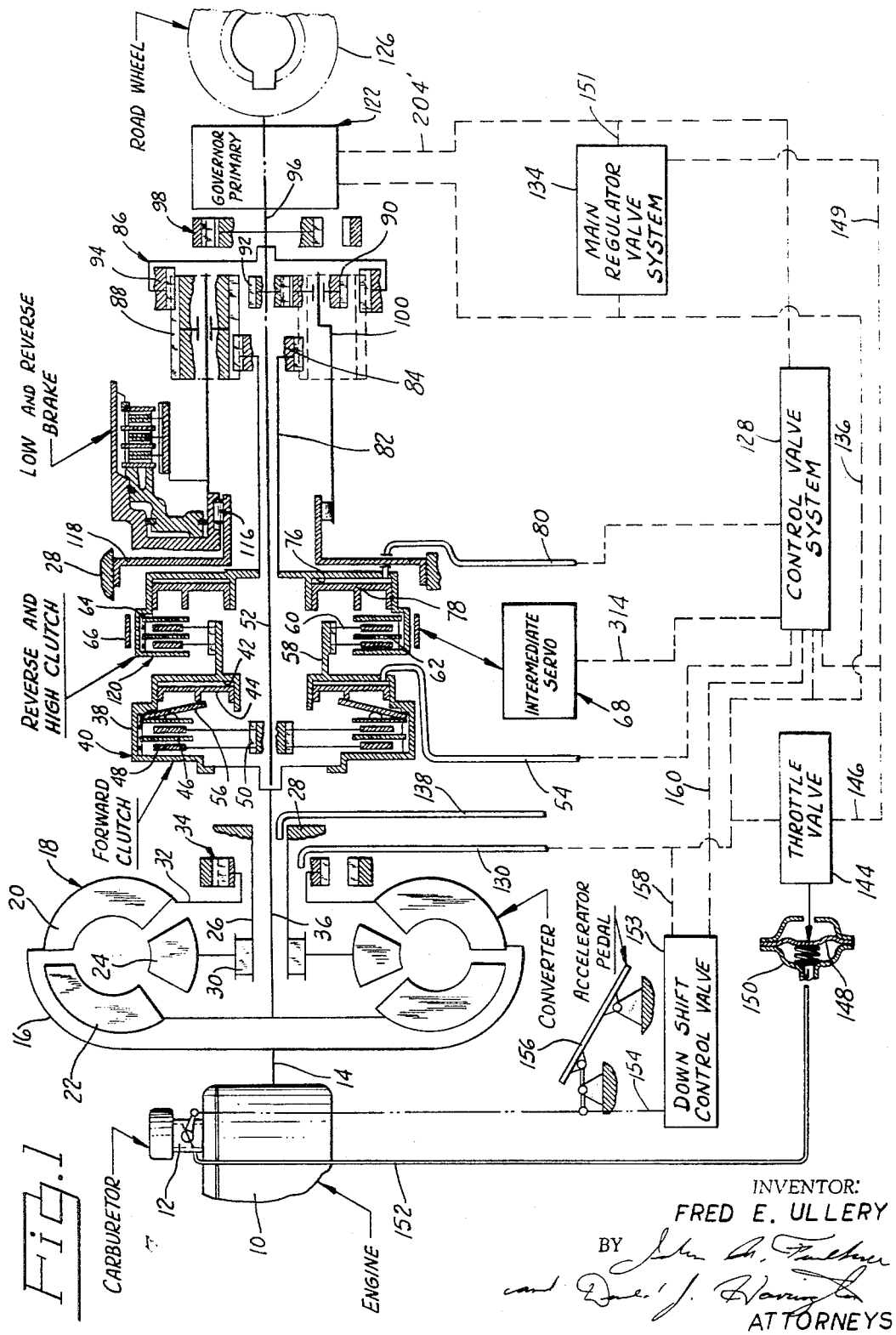

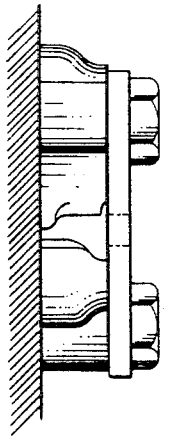
Fig.7
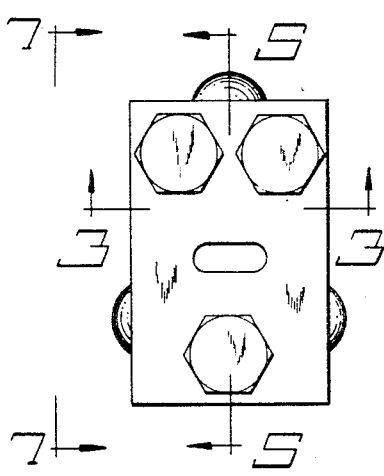
Fig.6
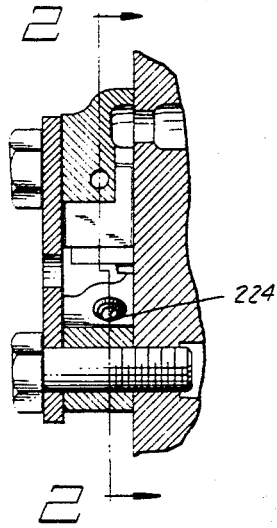
Fig.5
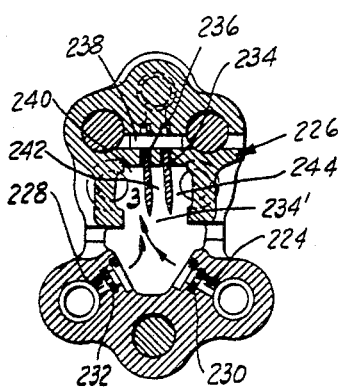
Fig.2-A
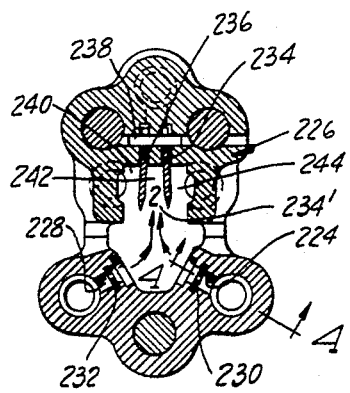
Fig.2
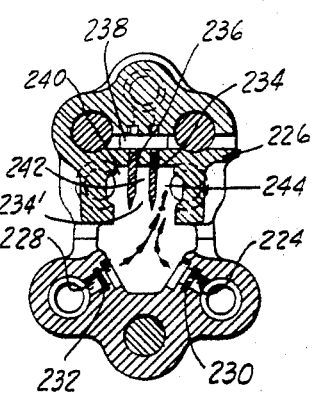
Fig.2-B
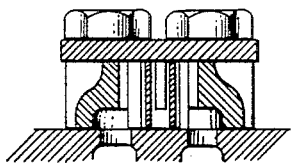
Fig.3
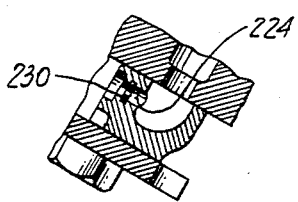
Fig.4
INVENTOR:
FRED E. ULLERY
BY
ATTORNEYS

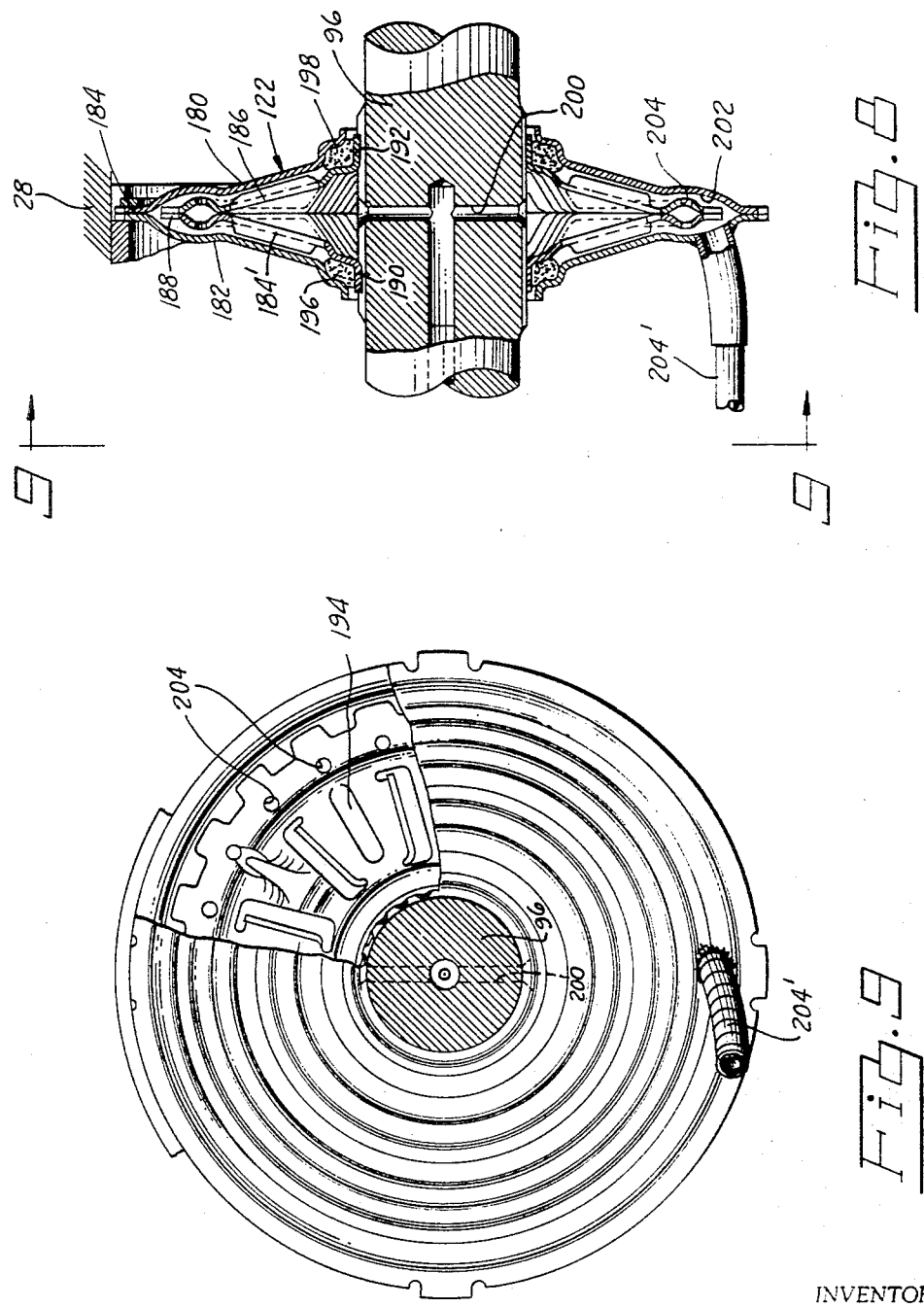

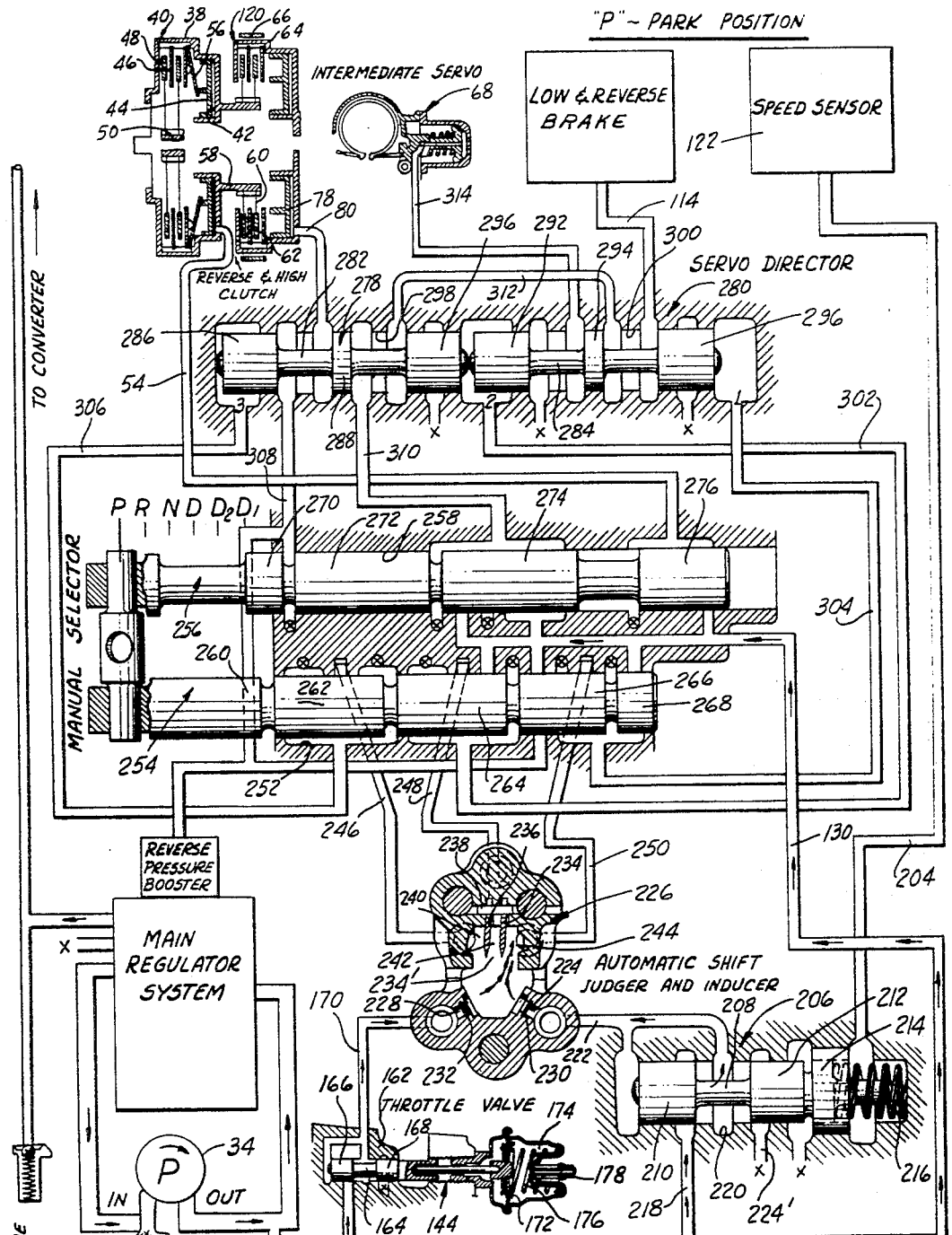

INVENTOR:
FRED E. ULLERY
ATTORNEYS

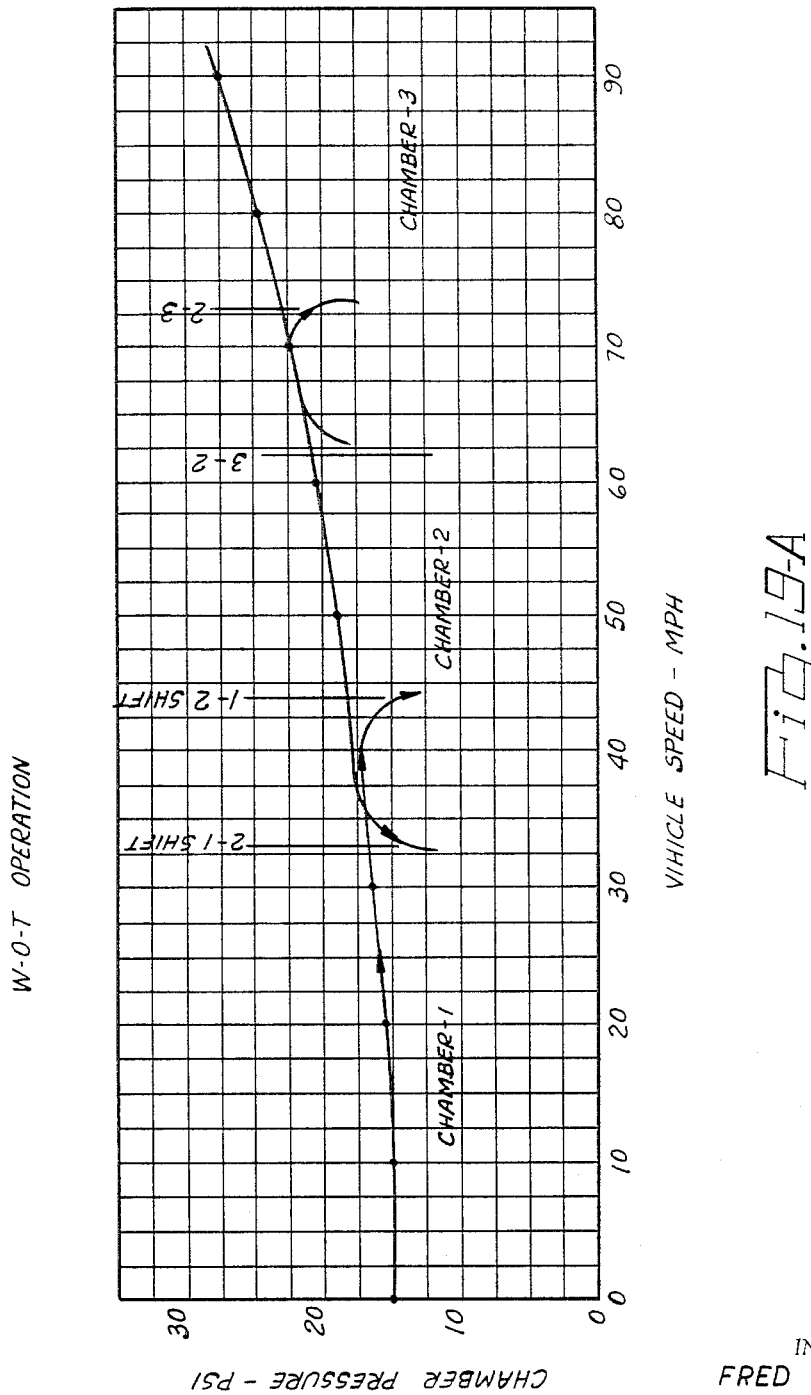

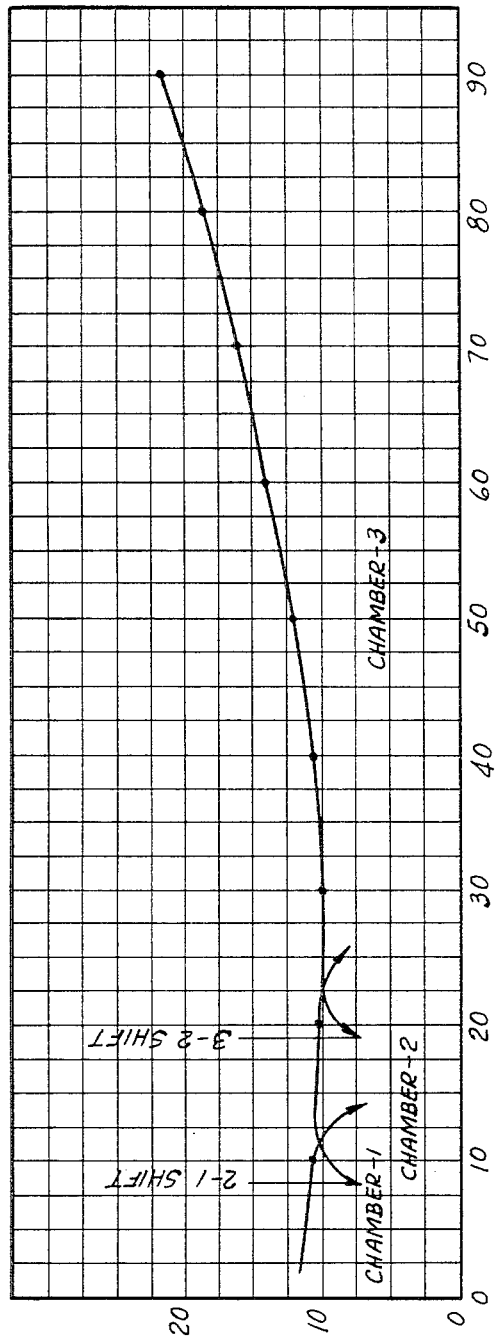

United States Patent Office
3,473,418
Patented Oct. 21, 1969

3,473,418
AUTOMATIC POWER TRANSMISSION CONTROL VALVE SYSTEM HAVING A FLUIDIC SHIFT INDUCER
Fred E. Ullery, Detroit, Mich., assignor to Ford Motor Company, Dearborn, Mich., a corporation of Delaware
Filed Mar. 11, 1968, Ser. No. 712,101
Int. Cl. B60k 23/00
U.S. Cl. 74—868   10 Claims

ABSTRACT OF THE DISCLOSURE

An automatic valve system for controlling ratio shifts in an automatic power transmission control having fluid pressure operated servos, including a "fluidic" shift inducer comprising two field control jets which merge to produce a resultant impact jet having an effective vector direction that is dependent upon the relative velocity of the two control jets and their angular disposition with respect to each other, the fluid velocity of one control jet being related to one operating variable of the control system and the fluid velocity of the other impact jet being related to another control variable, wherein changes in the direction of the resultant impact jet trigger automatic control responses in the valve system.

BRIEF SUMMARY OF THE INVENTION

My invention relates generally to an automatic power transmission mechanism for use in an automotive vehicle driveline. The transmission mechanism, which establishes plural torque delivery paths between an internal combustion engine in the driveline and the vehicle traction wheels, includes fluid pressure operated clutch and brake servos. By engaging and disengaging the servos, the relative motion of the torque transmitting elements in the transmission mechanism can be controlled as ratio changes are made.

An engine-driven, positive-displacement pump serves as a pressure source for the servos. Conduit structures interconnecting the pressure source of the servos includes pressure distributor valves which control the application and release of pressure for the servos as they are shifted from one operating position to another. Valve operating modes and shifts sequence patterns can be established by means of a driver-operated, manual selector valve located in the conduit structure between the distributor valves and the pressure source.

The position of the distributor valves is determined by balance hydrostatic forces that are established by an automatic shift inducer of the fluidic type. This includes two control jets that are arranged in a common valve cavity so that one impacts the other to produce a resultant impact jet with vector characteristics that are determined by the two component control jets. One control jet is sensitive to the driven speed of the transmission mechanism and the other control jet is sensitive to engine torque demand. The direction of the two control jets is fixed although the velocity of each can be varied in response to these two control variables.

Both the velocity and the direction of the resultant impact jet can be changed as the relative magnitudes of the two control variables change. As the result velocity vector direction changes, any one of multiple fluidic impact chambers is pressurized by the resultant jet. This establishes selectively a pressure increase in one of the fluidic impact chambers. Provision is made for transferring the static pressure in the affected fluidic impact chamber to the servo distributor valves, hereinafter called directors, thereby altering the hydrostatic force balance acting on them. The operating positions of the servo directors thus can be controlled so that they are capable of establishing ratio changes upon application and release of the clutch and brake controlling servos.

BRIEF DESCRIPTION OF THE FIGURES OF THE DRAWING

FIGURE 1 shows in schematic form an automatic power transmission gearing system capable of embodying the improved control system of my invention.

FIGURE 2 is a sectional view taken along section line 2—2 of FIGURE 5, showing a ratio shift inducer valve that forms a part of the control system used with the FIGURE 1 construction.

FIGURE 2A and 2B are views similar to FIGURE 2 except that they show two additional operating conditions for the inducer.

FIGURE 3 is a cross-sectional view taken along the plane of section line 3—3 of FIGURE 6.

FIGURE 4 is a cross-sectional view taken along the plane of section line 4—4 of FIGURE 2.

FIGURE 5 is a cross-sectional vew taken along the plane of section 5—5 of FIGURE 6.

FIGURE 6 is an end elevation view with the valve body shown in FIGURES 2–5.

FIGURE 7 is a side elevation view of the structure of FIGURE 6 as seen from the plane of section line 7—7 of FIGURE 6.

FIGURE 8 is a longitudinal cross-sectional view of a speed sensor of the centrifugal type for developing a speed signal for the inducer of FIGURE 2.

FIGURE 9 is a side elevation view, partly in transverse cross section, of the structure of FIGURE 8. It is taken along the plane of section line 9—9 of FIGURE 8.

FIGURES 10–18 show an automatic control valve system embodying the inducer of FIGURE 2, each view showing a different operating condition.

FIGURE 19A is a chart showing the shift points that occur during acceleration.

FIGURE 19B is a chart showing the shift points that occur during deceleration.

PARTICULAR DESCRIPTION OF THE INVENTION

Figure 11:
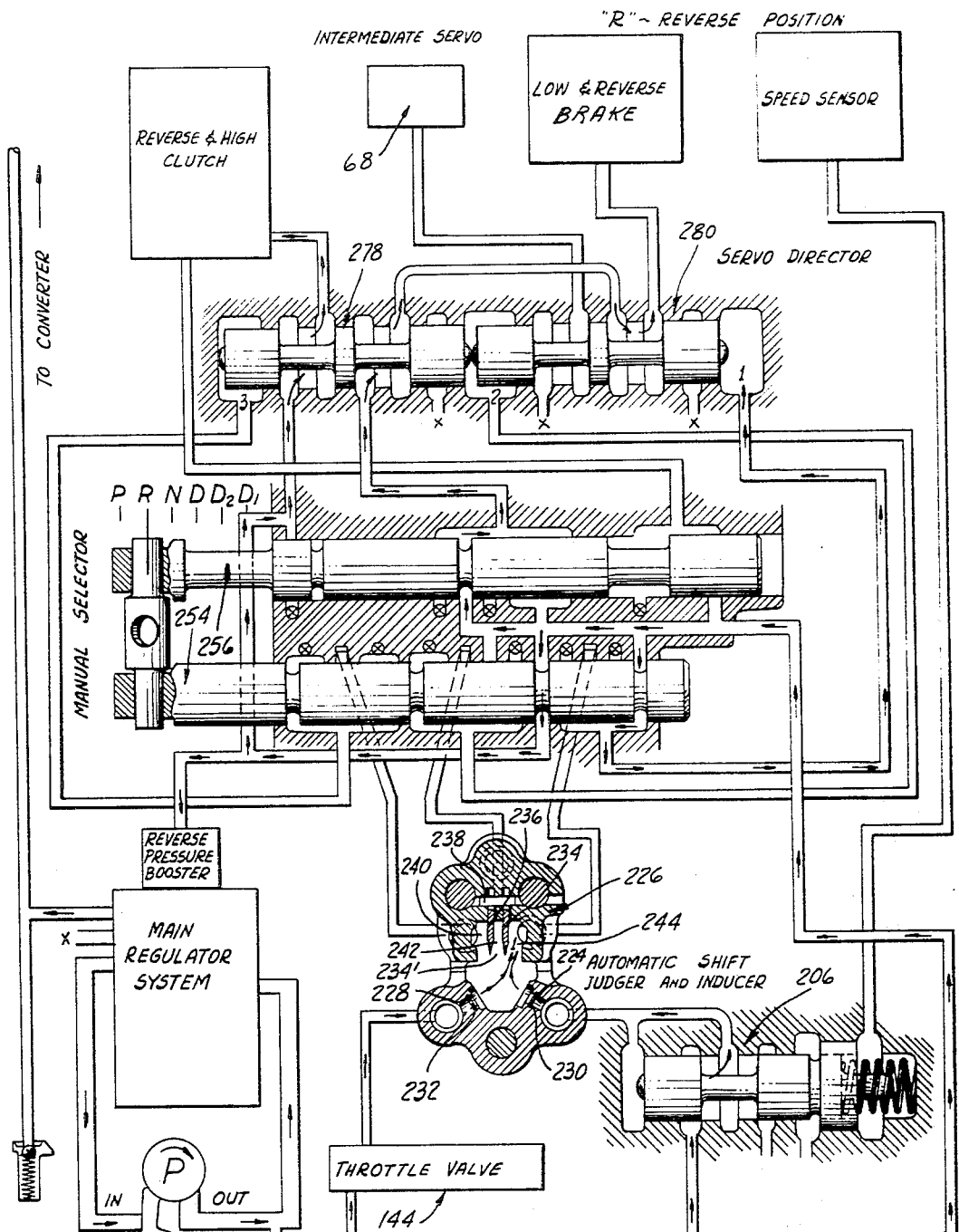

FIGURE 1, numeral 10 designates an internal combustion vehicle engine having an air-fuel induction system with a throttle controlled carburetor throat 12. The engine crankshaft 14 is connected drivably to an impeller drive shell 16 for a hydrokinetic torque converter unit 18. The unit 18 includes a bladed impeller 20, a bladed turbine 22 and a bladed stator 24, all of which are disposed in toroidal fluid flow relationship in a common torus circuit.

Stator 24 is mounted upon a stationary sleeve shaft 26 which is connected to a relatively stationary transmission housing shown in part at 28. An overrunning brake 30 establishes a one-way connection between stator 24 and shaft 26. It inhibits rotation of stator 24 in one direction but accommodates freewheeling motion thereof in the direction of rotation of the impeller 20.

The hub 32 of the impeller 20 is drivably connected to a positive displacement gear pump 34. The pump 34 thus is driven whenever the engine 10 is in operation. It functions as fluid pressure source for an automatic control system that will be described in part in other portions of this specification.

The hub of turbine 22 is connected to a central turbine shaft 36 which in turn is connected to a clutch drum 38. This drum forms a part of a multiple disc clutch assembly 40 and defines an annular cylinder 42 within which is slidably positioned an annular piston 44. Multiple friction discs 46 are externally splined to the interior of drum 38 and are situated in interdigital relationship with respect to cooperating friction discs 48. These discs 48 are carried drivably by an externally splined clutch element 50 which is connected to a torque delivery shaft 52.

Fluid pressure can be admitted to the pressure chamber defined by the cylinder 42 and the piston 44 through a clutch pressure feed passage 54. The pressure acting upon the piston 44 is transferred to the friction discs 46 and 48 by means of a Belleville spring washer 56 which is anchored at its outer periphery to the interior of the drum 38.

The pressure force applied to the piston 44 thus causes the discs 46 and 48 to become frictionally engaged to establish a driving connection between shaft 36 and shaft 52. Drum 38 includes an extension 58 which carries externally splined discs 60. These are situated in interdigital relationship with respect to discs 62 carried by a drum 64. A front brake band 66 surrounds drum 64 and may be applied and released by means of a suitable fluid pressure operated brake servo 68. The servo 68 includes a cylinder 70 within which is positioned a piston 72. This piston is operatively connected by means of a suitable linkage system 74 to one end of the brake band 66.

Drum 64 defines an annular cylinder 76 within which is positioned an annular piston 78. Fluid pressure is admitted to the cylinder 76 through a clutch pressure feed passage 80.

The drum 64 is connected to a sun gear sleeve shaft 82 which in turn extends to a relatively large pitch diameter sun gear 84 for a compound planetary gear unit 86. A set of long planet pinions 88 engages sun gear 84. A set of short planet pinions 90 engages a smaller diameter sun gear 92, and also the planet pinions 88. Pinions 88 engage a ring gear 94 which in turn is connected to a power output shaft 96. A rear pump 98 is drivably connected to the shaft 96 and functions to supplement the action of the front pump 34.

A common carrier 100 rotatably supports the set of planet pinions 90 as well as the set of planet pinions 88. It includes a brake drum 102 about which is positioned a rear brake band 104. This band 104 can be applied and released by means of a fluid pressure operated brake servo 106. The servo includes a cylinder 108 within which is positioned a servo piston 110. The piston 110 is connected mechanically to the brake band 104 by a suitable linkage mechanism 112.

Pressure can be admitted through the pressure chamber defined by the piston 110 and the cylinder 108 through the pressure feed passage 114. Brake band 104 can be applied in this fashion during continuous operation in the low speed ratio range and during operation in reverse.

Carrier 100 defines an outer race for an overrunning brake identified by reference character 116. An inner race for the brake 116 is defined by a stationary wall 118 which may be connected to a stationary housing 28. Sun gear 92 is connected directly to shaft 52 so that when the front clutch 40 is applied, a direct connection is established between sun gear 92 and the shaft 36. The rear clutch of which discs 60 and 62 from a part is identified generally by reference character 120. When it is applied, a direct connection is established between shaft 36 and sun gear 84.

A fluid pressure governor mechanism 122 connected drivably to the power output shaft 96 functions to supply a pressure signal that is related in magnitude to the driven speed of shaft 96. The vehicle traction wheels 126 can be connected to the shaft 96 through a suitable driveline.

To establish low speed ratio operation, the front clutch 40 is applied. Turbine torque developed by the torque converter unit 18 then is distributed through shaft 36 and through the applied front clutch to shaft 52, thereby driving sun gear 92. Overrunning brake 116 acts as a reaction member and holds the common carrier 100 in a stationary position. Ring gear 94 thus is driven at a reduced speed and its motion is imparted to the power output shaft 96.

To establish intermediate speed ratio operation, the front clutch 40 remains applied and the front brake 66 is applied. This anchors sun gear 84 so that it acts as a reaction member. Overrunning brake 116 freewheels under these conditions. Thus the ring gear and the power output shaft 96 are driven at an increased speed ratio that is greater than the low speed ratio but less than unity.

To establish high speed ratio direct drive operation, both clutches are applied simultaneously and the brake band 66 is released. This locks together the sun gears and the elements of the gear system thus rotate in unison with a 1–1 speed ratio. Overrunning brake 116 freewheels as it does during intermediate speed ratio operation.

To establish reverse drive, the rear brake band 104 is applied, the front clutch 40 is released and the rear clutch 120 is applied. Brake band 66, of course, is released. Turbine torque then is delivered from shaft 36 through the applied rear clutch to shaft 82 thus driving sun gear 84. The carrier acts as a reaction member since it is anchored by the rear brake band 104. The ring gear 94 thus is driven in a reverse direction.

Distribution of fluid pressure to the servos shown in FIGURE 1 is controlled by a control valve system 128. Fluid pressure from the front pump 34 is distributed to the valve system 128 through a high pressure fluid feed passage 130. The magnitude of the pressure in passage 130 is regulated by a main regulator valve system 134 which communicates with the passage 130 through a branch passage 136. A low pressure fluid supply passage for the pump 34 is shown at 138 and it communicates with the transmission sump disposed in the lower portion of the transmission housing 28.

The servo piston 72 and servo cylinder 70 cooperate to define a pair of pressure chambers 140 and 142. When both chambers 140 and 142 are pressurized, the piston 72 moves to a brake releasing position. If chamber 142 is exhausted, however, the piston 72 moves to a brake applying position. During operation of the transmission mechanism in the forward drive range, chamber 140 can be pressurized continuously.

A throttle valve mechanism 144 is capable of supplying a pressure signal that is related in magnitude to the torque requirements of the mechanism. This signal is distributed to the control system through a throttle pressure passage 146. The throttle valve mechanism includes a movable valve element that is connected to a flexible diaphragm 148 which forms a part of a vacuum servo assembly 150. The pressure chamber on one side of the diaphragm 148, which is subjected to engine intake manifold pressure, is connected to the carburetor throat 12 by means of an engine intake manifold pressure passage 152.

The control valve system 128 includes shift valves that respond to the throttle pressure signal made available to them through passage 146. They respond also to the governor pressure that is made available to the system 128 by passage 204.

Throttle pressure is distributed to the main regulator valve system through a boost pressure passage 149. Governor pressure is distributed also to the main regulator valve system through a passage 151. The magnitude of the regulated pressure maintained by the main regulator valve system 134 thus depends upon the magnitude of the throttle pressure signal and the governor pressure signal.

A downshift control valve 153 is under the control of the vehicle operator. It is connected by means of a linkage 154 to the vehicle engine carburetor accelerator pedal 156. The linkage 154 establishes a connection between the carburetor throttle valve and the accelerator pedal 156 as indicated. The main regulated control pressure is distributed to the downshift valve 153 through a branch passage 158 which communicates with the passage 130.

The output pressure of the valve 153 is distributed to the control valve system 128 through the passage 160 so that the automatic operation of the shift valves in the valve system 128 can be overruled when the engine carburetor throttle valve is moved to a wide open position.

The throttle valve system 144 includes a valve body 162 within which is positioned a valve spool 164. This spool is formed with two valve lands, 166 and 168, which register with internal valve lands formed in the valve body 162. The valve chamber for spool 164 is connected to the discharge side of the pump 34. Outlet pressure for the throttle valve system 144 is delivered to throttle pressure passage 170.

Valve spool 164 is connected mechanically to a flexible diaphragm 172 which closes one side of a manifold pressure chamber 174. Located in the chamber 174 is a valve spring 176. The interior of the chamber 174 is connected to the engine intake manifold for the engine 10, a suitable passage 152 and a fitting 178 being provided for this purpose. The balance forces established by the manifold pressure and by the spring 174 determine the operating forces acting on the valve spool 164. Feedback pressure in passage 170 acts on one side of the spool 164 and the combined spring and manifold pressure forces act on the other side of the spool 164. The resulting modulation produces an effective pressure signal in passage 170 which is related in magnitude to the engine torque demand on the engine.

The speed sensor 122, shown best in FIGURES 8 and 9, includes a pair of side plates 180 and 182 which are joined together at their peripheries, as shown at 184, and secured to the surrounding portion of the housing 28. They are held fast with respect to the rotary power output shaft 96.

A pair of rotor discs 184 and 186 is situated within the housing discs 180 and 182. They are joined together at their peripheries 188 and they are splined at their hubs 190 and 192, respectively, to the shaft 96. Radial flow passages 194 are formed by the rotor discs 184 and 186. These discs may be of stamped construction and the passages 194 can be formed by indentations formed in each of the discs. Fluid seals 196 and 198 provide a running seal between the rotary portions of the mechanism and the stationary portions.

Fluid from the pressure source 34 is distributed through the shaft 96 and through radial feed passages to the interior of the rotor discs 184 and 186. As the rotor rotates with the shaft 96, the fluid develops a centrifugal head as it is discharged radially outwardly under the influence of centifugal force. The pressure is allowed to accumulate in an annular ring chamber 202 formed by the stationary discs 180 and 182. The chamber 202 communicates with the interior of the rotor disc through peripheral passages 204. The static pressure developed in the chamber 202 is distributed in turn to speed sensitive portions of the valve system through governor pressure passage 204'.

A speed signal amplifier valve is shown at 206. It includes valve spool 208 having three spaced valve lands 210, 212 and 214, the diameter of land 214 being larger than the diameter of adjacent valve land 212. Valve spring 216 urges the valve spool 208 in a left-hand direction, as indicated in FIGURE 10. Control pressure from the pump 34 is distributed to the valve 206 through pressure feed passage 218. Lands 210, 212, and 214 register with internal valve lands formed in valve chamber 220.

The output signal of valve 206 is distributed through passage 222. The valve chamber 220 is exhausted through port 224. The signal in passage 222 is fed back to the left-hand side of the spool 208. The right-hand side of the land 214 communicates with the speed sensor signal passage 204'. Valve 206 thus modulates the pressure in the line pressure side passage 218 to produce a resultant signal in passage 222 that is functionally related in magnitude to the pressure in passage 204'. This signal is distributed to inlet port 224 of the shift inducer indicated generally at 226. The signal in passage 170 is distributed to the inducer 226 through port 228. A nozzle or jet in the form of an orifice 230 is situated in the port 224, and a corresponding nozzle or jet 232 is situated in port 228. Both ports communicate with an interior inducer valve cavity 234'.

The inducer includes a pair of deflector plates 236 and 234. These are formed with an opening through which a pin 238 is received. The diameter of the openings in the plates 236 and 234 is greater than the diameter of the pin 238. The plates 234 and 236 are located in the slots that also are greater than the width of the plates 234 and 236. Thus the plates 234 and 236 are adapted to wobble from one position to the other with respect to the fixed axis of the pin 238.

The plates 236 and 234 extend into the cavity 234' and define with the walls of the cavity 234' three impact pressure chambers identified separately by reference characters 240, 242 and 244. The chambers 240, 242 and 244 communicate, respectively, with signal passages 246, 248 and 250. Each of these passages communicates with the manual selector valve chamber 252. The manual selector valve comprises two valve spools 254 and 256, the spool 254 being slidably received in the valve chamber 252, and the valve spool 256 being slidably received within valve chamber 258.

Spool 254 includes spaced valve lands 260, 262, 264, 266 and 268. Valve spool 256 includes lands 270, 272, 274 and 276. The valve spools 254 and 256 can be moved by the vehicle operator to select any one of several operating modes which are indicated by the symbols P, R, N, D, D2 and D1. These correspond, respectively, to the Park position, the Reverse Drive position, the Neutral position, the Automatic Drive Range position, the Intermediate Ratio Lock-Out position, and the Low Speed Ratio Lock-Out position.

A pair of servo director valves 278 and 280 are in fluid communication with the manual selector valves. The director valves include valve spools 282 and 284. Spool 282 includes spaced valve lands 286, 288 and 290. Spool 284 includes spaced valve lands 292, 294 and 296. Spools 282 and 284 are situated, respectively, in valve chambers 298 and 300. The chambers 298 and 300 are in fluid communication with each other. The right-hand end of the chamber 298 and the left-hand end of the chamber 300 communicate with a common signal feed passage 302. The right-hand end of the chamber 300 communicates with another signal feed passage 304. The left-hand end of the chamber 298 communicates with another signal feed passage 306.

Each of these passages 302, 304 and 306 communicates with the inducer signal passages 246, 248 and 250 through the manual selector valve chamber 252. The lands 260, 262, 264, 266 and 268 control distribution of the signal pressure from passages 246, 248 and 250 to the servo director valves.

The servo director valves are in fluid communication with valve chamber 258 and the manual selector valves through crossover passages 308 and 310. The servo director valves themselves are connected by crossover passage 312. The intermediate servo feed passage 314 extends from the director valve 280 to the intermediate servo 68.

Figure 12:
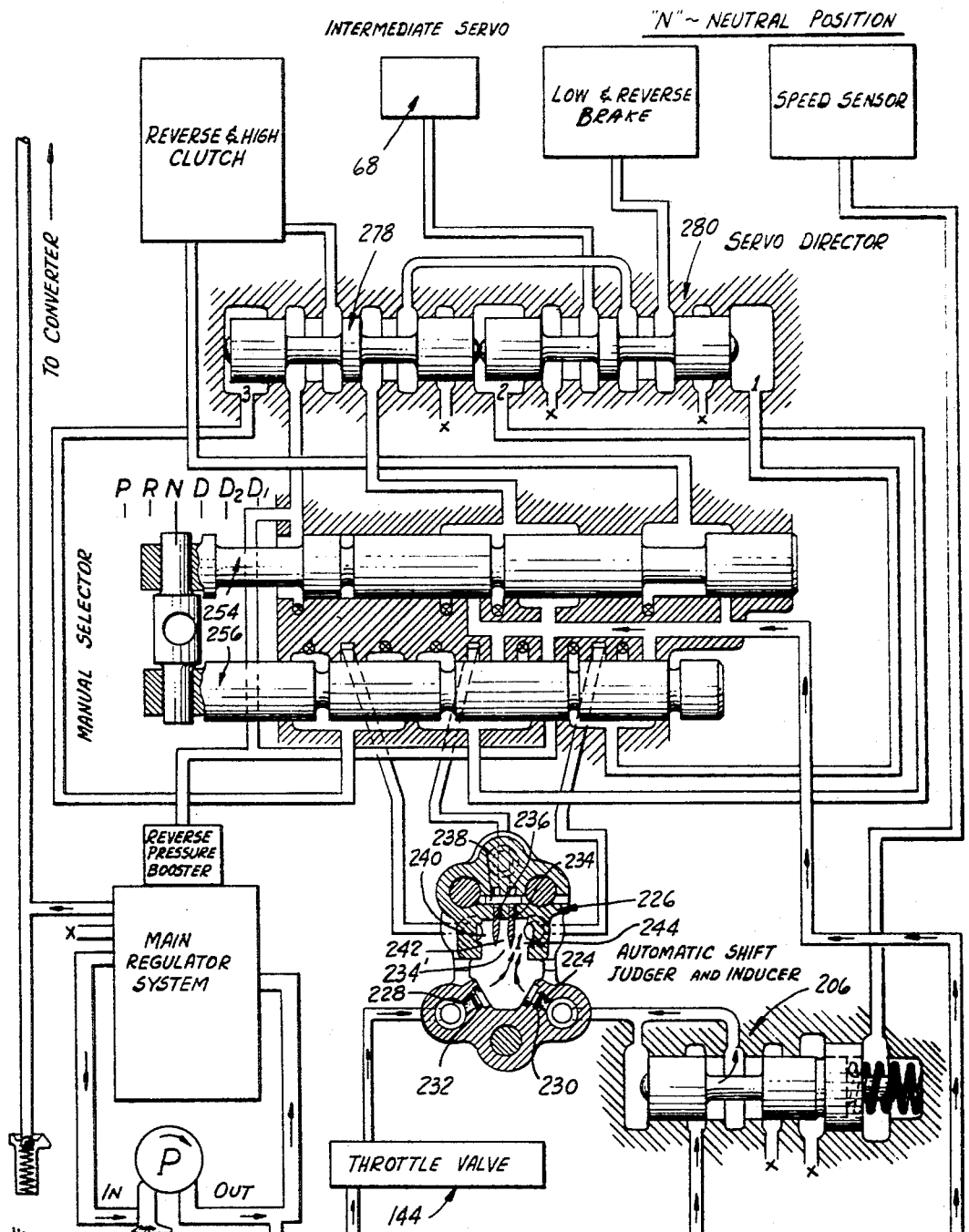

The manual selector valves can be connected mechanically to the parking brake for the automatic power transmission mechanism. When the manual selector valve assumes the position shown in FIGURE 10, the parking brake is actuated. The same is true when the manual selector valves assume the neutral position as indicated in FIGURE 12.

When the manual selector valves are moved to the reverse drive position R, as in FIGURE 11, the effective speed signal in passage 222 is a minimum. The throttle pressure signal in passage 170, however, compared to the value of the signal in passage 222, is sufficient to cause a resultant velocity jet in the direction of the arrows, as shown in FIGURE 10, so that the discharge of the nozzles 232 and 230 is received by the impact chamber 244. This produces an impact pressure in chamber 244 that is higher than the static pressure that exists in chambers 242 and 240. This pressure is distributed to passage 250, but this passage is blocked by the valve land 266. It is not distributed to the servo director valves. Valve land 266, however, uncovers passage 130 so that communication is established between passage 130 and the signal passage 304. This urges the servo director valves in a left-hand direction. The passage 306 is exhausted through the manual selector valve chamber 252 as the passage 306 is brought into communication with the exhaust port that is uncovered by land 262. All the exhaust ports are indicated by the reference symbol "x" in FIGURES 10–18.

Land 266 also establishes communication between passage 308 and passage 130 through the valve chamber 152. Passage 308 in turn communicates directly with the passage 80 through the director valve chamber 298, thereby causing the reverse clutch to become applied. Land 274 uncovers passage 130 and establishes communication between passage 130 and crossover passage 310. This in turn communicates with cross-over passages 312 so that control pressure can be distributed through the director valve chamber 300 to the low and reverse brake servo feed passage 114.

Figure 13:
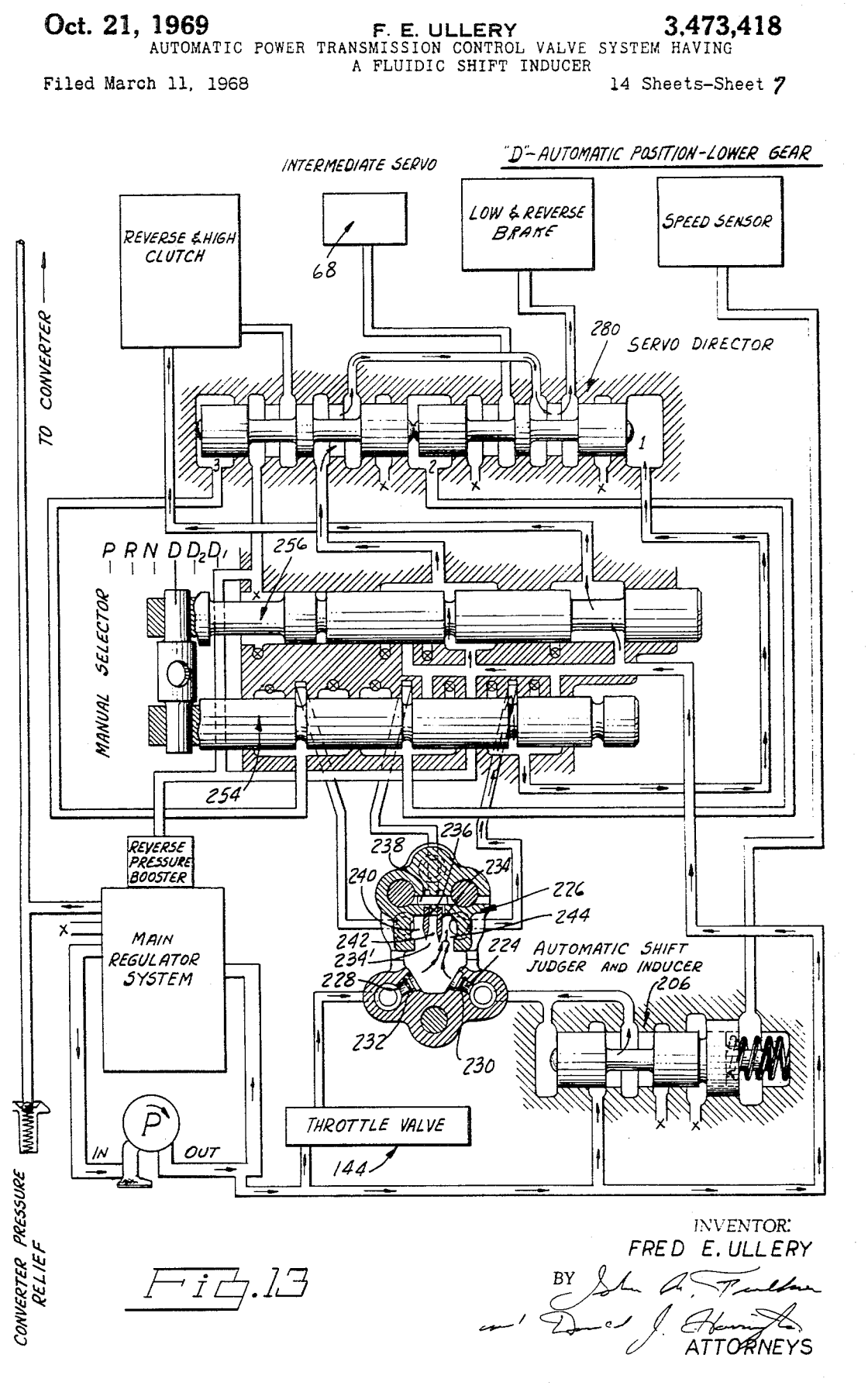

When the manual valve is shifted to the D position, and the vehicle is accelerated from a standing start with the manual selector valves in that position, the jet produced by the nozzle 232 in the inducer and the jet produced by nozzle 230 develop again a resultant jet as indicated by the arrows in FIGURE 13. This jet impacts in the chamber 244 so that the pressure in that chamber will exceed the pressure in the chambers 242 and 240. The manual selector valve is now positioned, however, so that the resulting pressure signal in passage 250 can be distributed through the manual selector valve 252 to the passage 304 and hence to the right-hand side of the servo director valve 280. At that time the inducer valve plate 234 tilts under the influence of the increased pressure in chamber 244 in a clockwise direction, as viewed in FIGURE 13.

The signal from passage 250 conditions the servo directors for application of the low speed ratio brake and the forward drive clutch. The manual selector valve element 256 will uncover passage 130 and will establish communication between passage 130 and passage 54 as land 276 uncovers passage 130 and land 274 covers the adjacent exhaust port. The servo director valves distribute control pressure from passage 310 through passage 312 and passage 114, the latter two being brought into communication through valve chamber 300.

Figure 14:
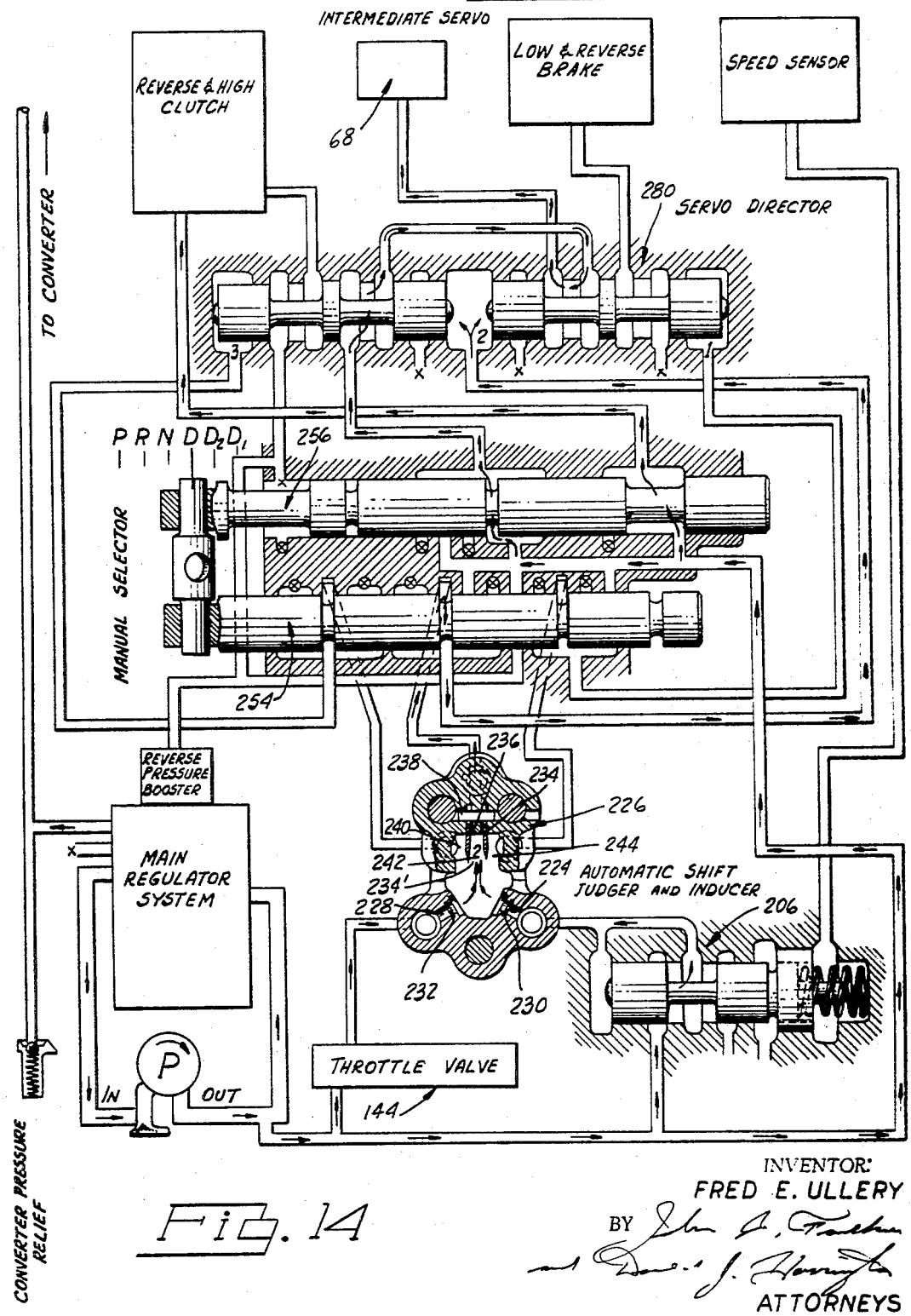

When the vehicle speed increases to a value that is sufficient to cause an increased velocity in the jet nozzle 230, the resultant jet produced by the impacting component jets in the inducer is positioned so that it will impact on impact chamber 242. This produces a pressure signal in passage 248 which is distributed to the center of the servo director valves, causing the valves to separate, as indicated in FIGURE 14. As the resultant inducer jet changes from the position for impact chamber 244 to the position for chamber 242, the valve plates 236 and 234 separate, the latter tilting in a counterclockwise direction and the former tilting in a clockwise direction. This introduces a hysteresis effect. Thus the speed at which a transfer of the resultant jet from chamber 242 to chamber 244 is less than the speed that existed during acceleration period as the resultant jet transferred from impact chamber 244 to chamber 242. The speed range in which the resultant jet will occupy impact chamber 242 then is increased. This produces an overlap that prevents undesirable hunting of the resultant jet between the two impact chambers 244 and 242.

The new position of the servo director valve 280 will result in an exhausting of the passage 114 and communicating passage 312 and intermediate servo feed passage 314. Passage 310 and 54 continue to be pressurized as before so that the forward drive clutch continues to be applied. The pressure in passage 310, however, is distributed to the intermediate servo rather than to the low-and-reverse brake because of the new position of the servo director valve 280.

Figure 15:
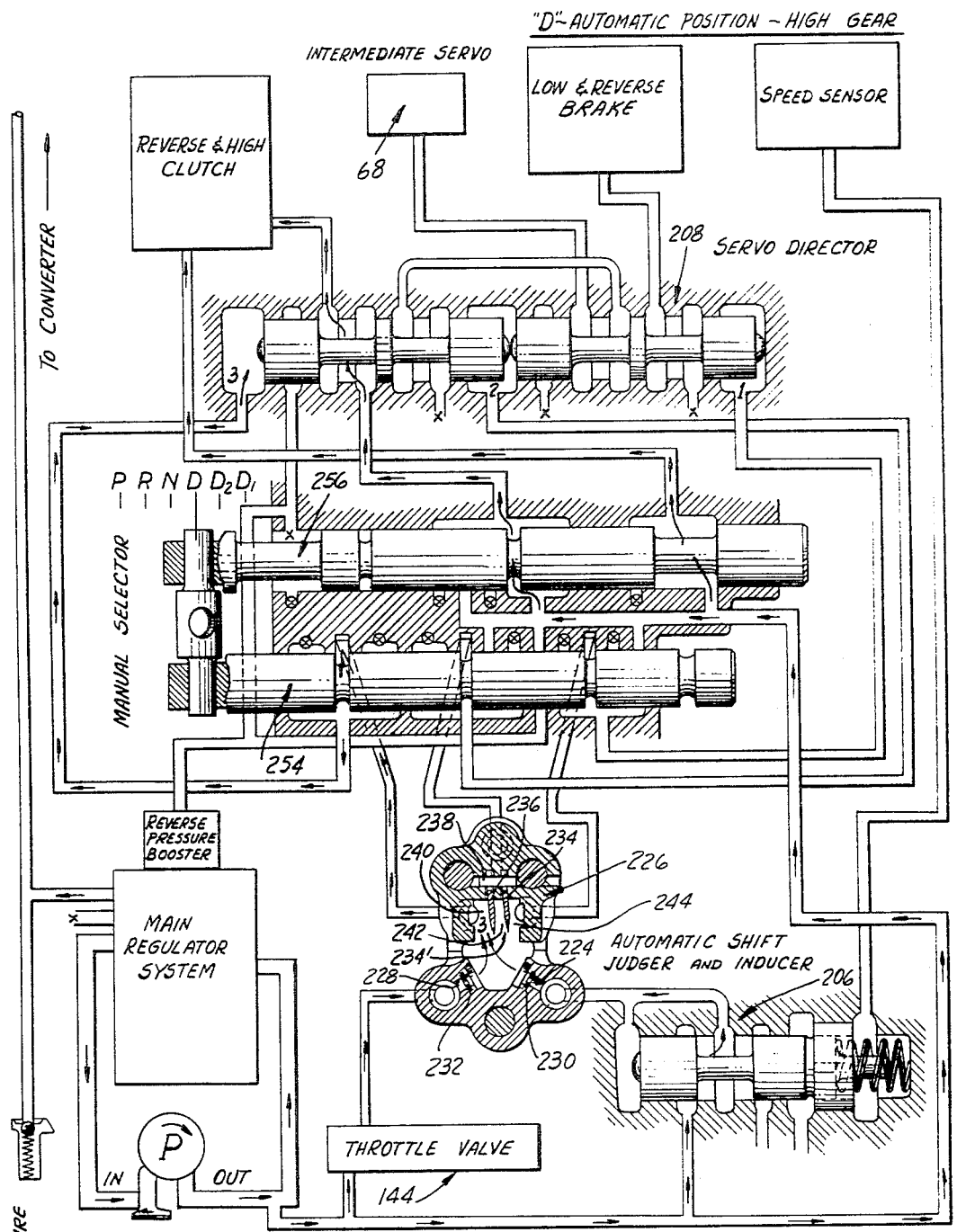
Figure 16:
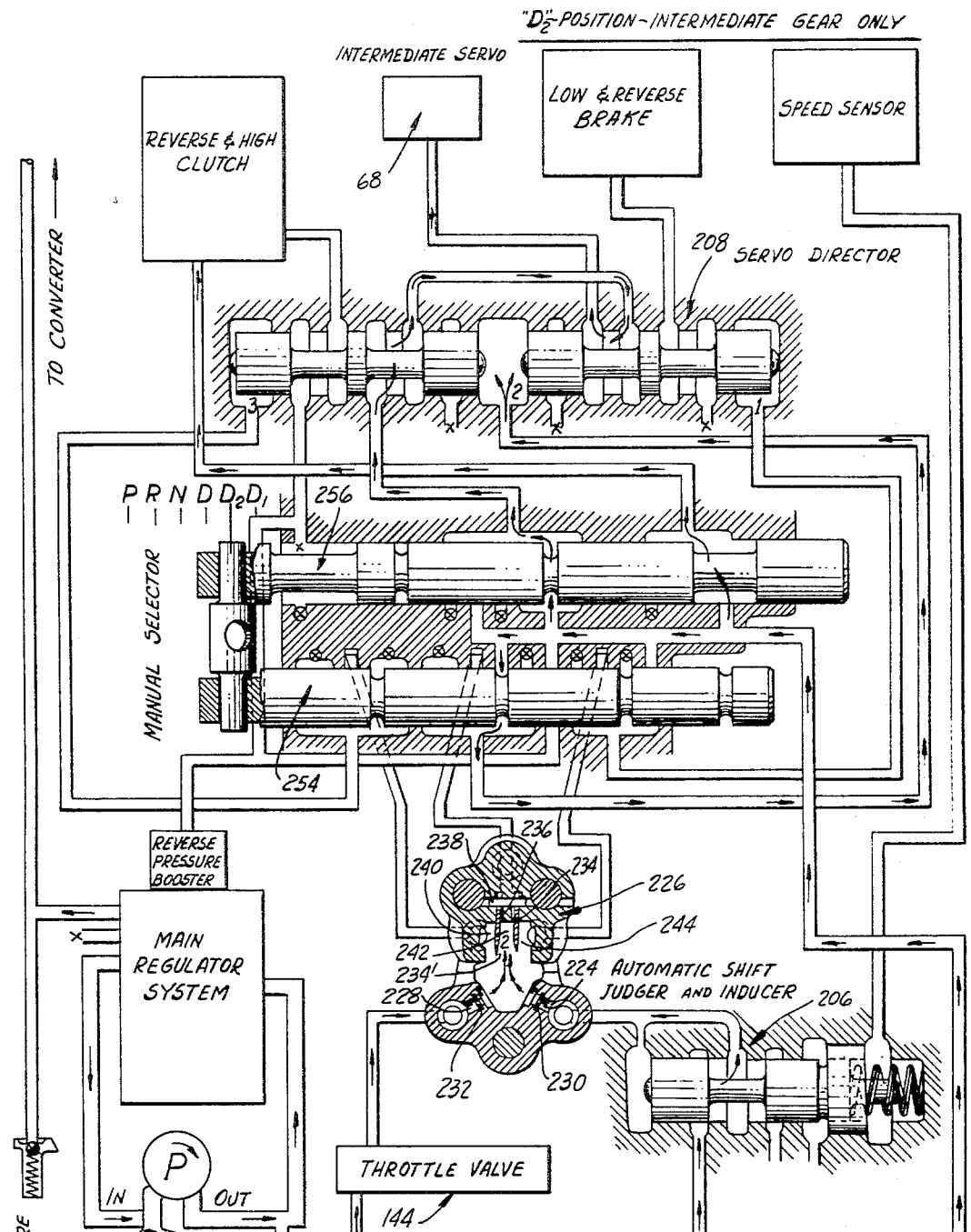
Figure 17:
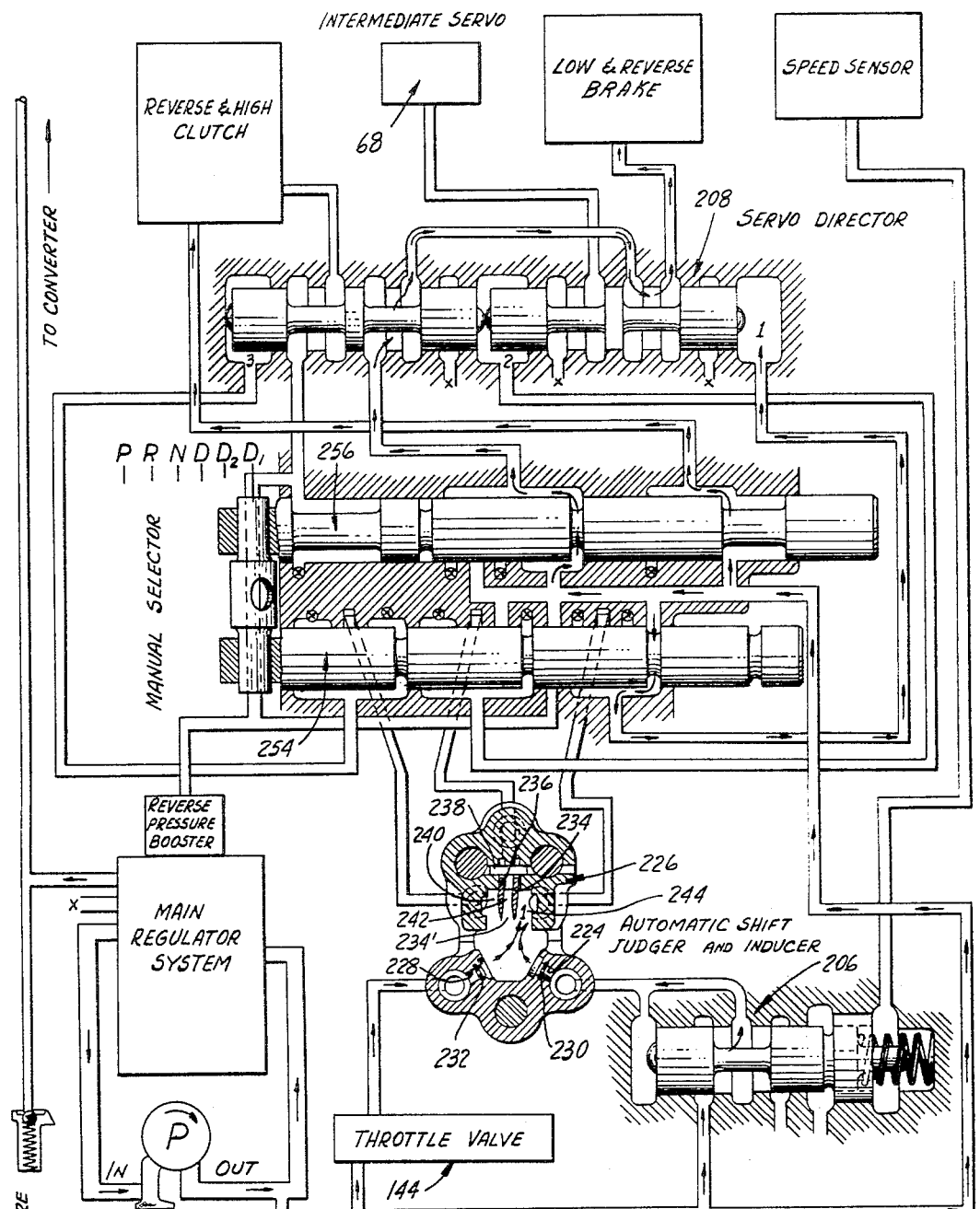
Figure 18:
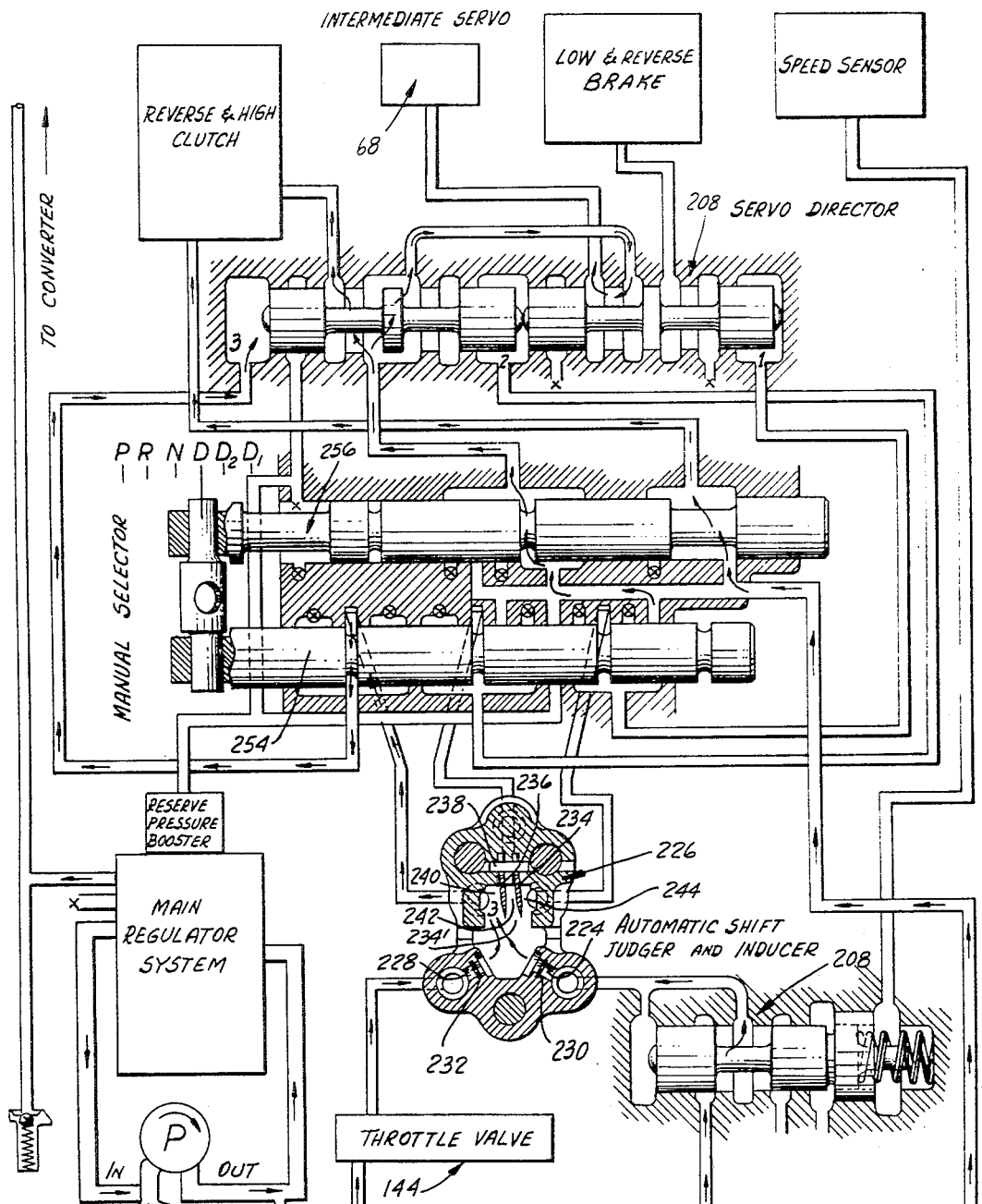

As the speed of the vehicle increases still further, the relative magnitudes of the speed sensitive jet 230 and the torque sensitive jet 228 increase, thereby causing a resultant jet that assumes a direction indicated by the arrows in FIGURE 15. This resultant jet impacts in the impact chamber 240, thereby causing the adjacent valve plate 236 to tilt in a counterclockwise direction. This tilting action again produces a desirable overlap in the action of the signals produced by the inducer. At this time the inducer signal is distributed to the passage 246 rather than to the other signal passages 248 and 250. The manual selector valve 254 then transfers this signal to the left-hand side of the director valve 278. This shifts the director valves in a right-hand direction since both of the other servo director signal passages are at a lower pressure.

The director valves now are conditioned to pressurize the high speed ratio clutch as passage 310 is brought into communication with passage 80 through the director valve chamber 298. The intermediate servo becomes exhausted through the servo director valve chamber 300 and through cross over passage 312, the latter communicating with the exhaust port formed in chamber 298. The low-and-reverse servo is exhausted through passage 114 and through the exhaust port formed in director valve chamber 300.

If continuous operation in the intermediate speed ratio is desired, the manual selector valves are moved to the D2 position. When they are in that position they again block each of the inducer signal passages 246, 248 and 250. The same is true if the operator desires to operate the transmission mechanism in the low speed range only. If the manual selector valve assumes the D2 position, the passage 130 is brought into fluid communication with the intermediate servo through the valve chamber 258, passage 310, director valve chamber 298, passage 312, director valve chamber 300 and passage 314. At the same time passage 130 is brought into communication with passage 54 through the valve chamber 258.

Passage 302 is pressurized at this time by control pressure which is distributed to it through chamber 252. This pressure is distributed to the servo director valve chambers so that the two director valve spools 282 and 284 are urged apart.

When the manual selector valves assume the D1 position, control pressure is distributed to signal passage 304. At the same time the intermediate section of the servo director valve chambers is exhausted through the manual selector valve chamber 252. Thus a servo director valve is shifted in a left-hand direction thereby again conditioning the transmission system for continuous operation in the lowest speed ratio.

Although the shift inducer of the circuit described herein has three impact chambers, four impact chambers could be used if this system is adapted for use with a four-speed ratio transmission mechanism. Also a fewer number of impact chambers could be used if, for example, an automatic shift to low gear could be accomplished by means of a spring force acting on the servo director valve 280 to urge the valve in a left-hand direction as the hydrostatic force is acting on the valves in a right-hand direction are overcome by the spring force.

In FIGURES 19A and 19B are shown the shift points that occur during acceleration from a standing start and during coast-down operation. FIGURE 19A further shows the downshift points during wide-open throttle operation.

The 2–1 downshift point and the 3–2 downshift point during coast-down operation occur at a substantially lower vehicle speed than the downshift points that occur during forced downshift operation as shown in FIGURE 19A.

This is due to the hysteresis feature of the inducer. Furthermore, the horizontal spread between the 2–1 downshift point and the 1–2 upshift point and the horizontal spread between the 3–2 downshift point and the 2–3 upshift point is due to the hysteresis feature of the inducer as indicated in FIGURE 19A. For purposes of clarity, the various operating zones during which the resultant fluid jet impacts in their respective chambers 1, 2 and 3 have been indicated on the chart as chamber 1 zone, chamber 2 zone, and chamber 3 zone.

Having thus described a preferred form of my invention, what I claim and desire to secure by use of U.S. Letters Patent is:

1. In a control system for a multiple ratio power transmission mechanism having friction clutch and brake means for controlling the relative motion of torque delivery elements of the mechanism, multiple fluid pressure operated servos for actuating and releasing said clutch and brake means, a fluid pressure source, conduit structure interconnecting said pressure source and said servos, servo director valves situated in and partly defining said conduit structure for controlling selectively the distribution of pressure to the said servos to initiate ratio changes, a shift inducer, a source of speed signal that is sensitive to a driven speed of driven portions of said mechanism, a source of speed signal that is sensitive to changes in torque delivered through said mechanism, said shift inducer comprising a fluid flow jet in fluid communication with said speed signal source, a second fluid flow jet in fluid communication with said torque sensitive signal source, jet inducer fluid chamber, fluid jets developed by said inducer impacting upon each other in said fluid chamber to produce a resultant fluid control jet, multiple fluid impact chambers in said inducer, said resultant fluid control jet being directed into each impact chamber selectively as its resultant vector angle changes, and signal passage means extending from each impact chamber to portions of said director valves to trigger a valve response thereby initiating ratio changes as the angular disposition of said control jet changes upon the change in the relative magnitudes of the component jets developed by said speed sensitive signal and said torque sensitive signal.

2. In a control system for a multiple ratio power transmission mechanism having friction clutch and brake means for controlling the relative motion of torque delivery elements of the mechanism, multiple fluid pressure operated servos for actuating and releasing said clutch and brake means, a fluid pressure source, conduit structure interconnecting said pressure source and said servos, servo director valves situated in and partly defining said conduit structure for controlling selectively the distribution of pressure to the said servos to initiate ratio changes, a shift inducer, a source of speed signal that is sensitive to a driven speed of driven portions of said mechanism, a source of speed signal that is sensitive to changes in torque delivered through said mechanism, said shift inducer comprising a fluid flow jet in fluid communication with said speed signal source, a second fluid flow jet in fluid communication with said torque sensitive signal source, jet inducer fluid chamber, fluid jets developed by said inducer impacting upon each other in said fluid chamber to produce a resultant fluid control jet, multiple fluid impact chambers in said inducer, said resultant fluid control jet being directed into each impact chamber selectively as its resultant vector angle changes, and signal passage means extending from each impact chamber to portions of said director valves to trigger a valve response thereby initiating ratio changes as the angular disposition of said control jet changes upon a change in the relative magnitudes of the component jets developed by said speed sensitive signal and said torque sensitive signal, manual selector valve means situated in portions of said conduit structure by-passing said servo director valves and situated in part also in said conduit structure between said servo director valves and said pressure source, said manual selector valve means thereby being adapted to control the mode of pressure distribution to said servo director valves and to said servos to condition said mechanism for any one of several operating modes.

3. The combination as set forth in claim 1 wherein said inducer comprises movable inducer blades situated in spaced and generally parallel relationship in said chamber thereby defining chamber impact portions, and means for mounting said blades for limited shifting movement relative to said speed sensitive jet, to said torque sensitive jet and to each other whereby the angular disposition of said resultant control jet during a transition thereof from one impact chamber to a second impact chamber is different than the angular disposition during a transition from said other impact chamber to said one impact chamber.

4. The combination as set forth in claim 2 wherein said inducer comprises movable inducer blades situated in spaced and generally parallel relationship in said chamber thereby defining said chamber impact portions, and means for mounting said blades for limited shifting movement relative to said speed sensitive jet, to said torque sensitive jet and to each other whereby the angular disposition of said resultant control jet during a transition thereof from one impact chamber to a second impact chamber is different than the angular disposition during a transition from said other impact chamber to said one impact chamber.

5. The combination as set forth in claim 1 wherein said speed sensitive signal source comprises a rotary pressure generator connected drivably to driven portions of said mechanism, said generator being in fluid communication with said pressure source, a governor pressure passage extending from said generator, pressure amplifier valve means communicating with said governor pressure passage comprising modulator valve element communicating with said pressure source, one end of said modulator valve element being subjected to the pressure in said governor pressure passage, an amplifier output pressure passage extending from said amplifier valve element to said speed sensitive control jet whereby fluid is discharged through the latter at a speed that is proportional in magnitude to the speed of said driven portion.

6. The combination as set forth in claim 2 wherein said speed sensitive signal source comprises a rotary pressure generator connected drivably to driven portions of said mechanism, said generator being in fluid communicating with said pressure source, one end of said sure passage extending from said generator, pressure amplifier valve means communicating with said governor pressure passage comprising a modulator valve element communicating with said pressure source, one end of said modulator valve element being subjected to the pressure in said governor pressure passage, an amplifier output pressure passage extending from said amplifier valve element to said speed sensitive control jet whereby fluid is discharged through the latter at a speed that is proportional in magnitude to the speed of said driven portion.

7. The combination as set forth in claim 3 wherein said speed sensitive signal source comprises a rotary pressure generator connected drivably to driven portions of said mechanism, said generator being in fluid communication with said pressure source, a governor pressure passage extending from said generator, pressure amplifier valve means communicating with said governor pressure passage comprising a modulator valve element communicating with said pressure source, one end of said modulator valve element being subjected to the pressure in said governor pressure passage, an amplifier output pressure passage extending from said amplifier valve element to said speed sensitive control jet whereby fluid is discharged through the latter at a speed that is proportional in magnitude of the speed to said driven portion.

8. The combination as set forth in claim 4 wherein said speed sensitive signal source comprises a rotary pressure generator connected drivably to driven portions of said mechanism, said generator being in fluid communication with said pressure source, a governor pressure passage extending from said generator, pressure amplifier valve means communicating with said governor pressure passage comprising a modulator valve element communicating with said pressure source, one end of said modulator valve element being subjected to the pressure passage extending from said amplifier valve element to said speed sensitive control jet whereby fluid is discharged through the latter at a speed that is proportional in magnitude to the speed of said driven portion.

9. The combination as set forth in claim 1 wherein said speed sensitive jet and said torque sensitive jet have intersecting lines of action whereby a zone of maximum static pressure is developed, the location of said zone of maximum pressure being shiftable in said chamber as the relative magnitudes of the velocity of said jets change, the impact chamber closest to said zone of maximum pressure thereby being pressurized to a degree that is greater than the degree of pressurization of the other impact chambers.

10. The combination as set forth in claim 2 wherein said speed sensitive jet and said torque sensitive jet have intersecting lines of action whereby a zone of maximum static pressure is developed, the location of said zone of maximum pressure being shiftable in said chamber as the relative magnitudes of the velocity of said jets change, the impact chamber closest to said zone of maximum pressure thereby being pressurized to a degree that is greater than the degrees of pressurization of the other impact chambers.

References Cited
UNITED STATES PATENTS

| | | | |
|---|---|---|---|
| 3,180,173 | 4/1965 | Fisher et al. | 74—868 |
| 3,208,463 | 9/1965 | Hurvitz | 137—81.5 |
| 3,405,575 | 10/1968 | Searles et al. | 74—868 |

ARTHUR T. McKEON, Primary Examiner

U.S. Cl. X.R.

137—81.5